Aug. 4, 1936.     E. GETAZ     2,049,836
COIN OPERATED LIQUID MEASURING AND DISPENSING DEVICE
Filed Sept. 21, 1934     3 Sheets-Sheet 1
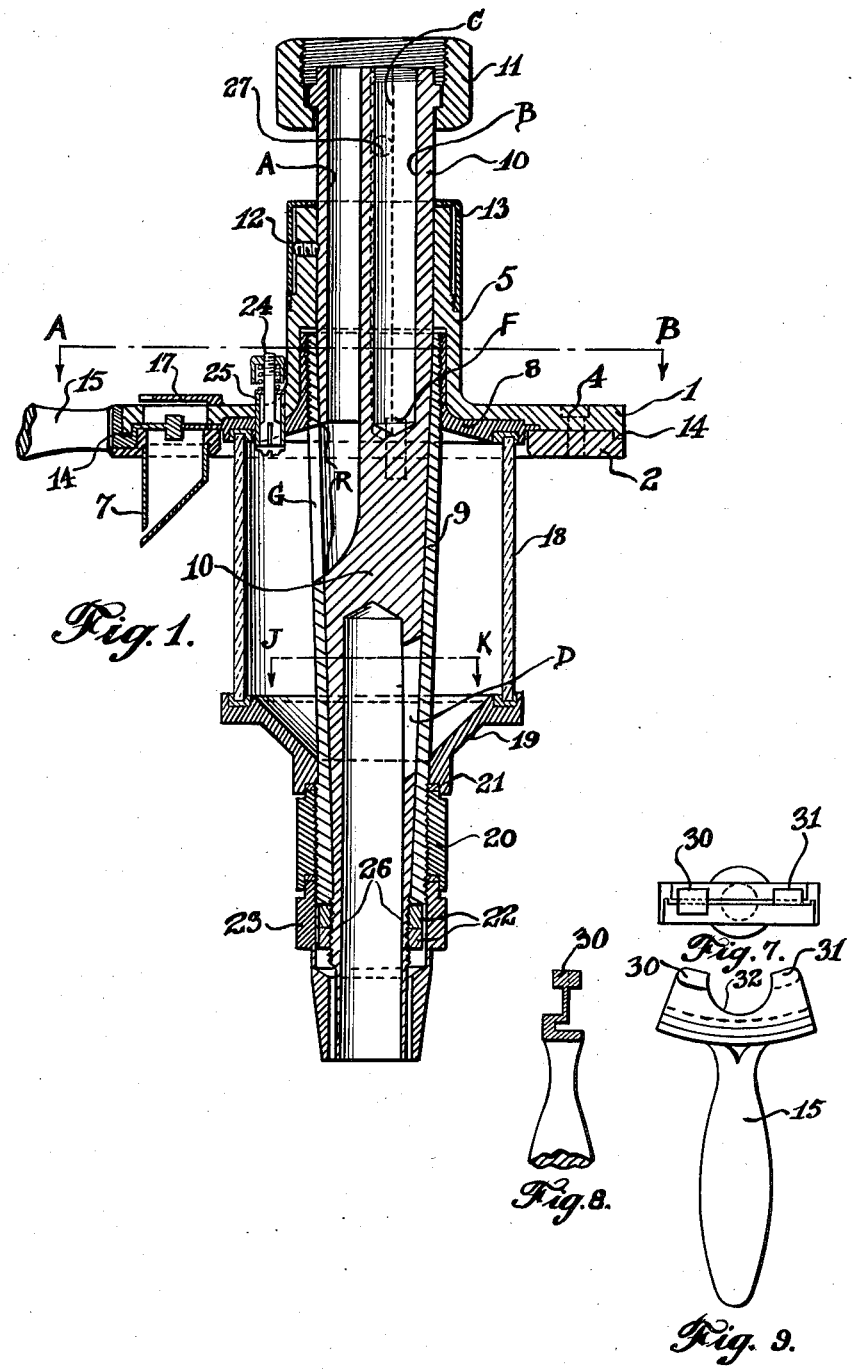

Aug. 4, 1936.  E. GETAZ  2,049,836
COIN OPERATED LIQUID MEASURING AND DISPENSING DEVICE
Filed Sept. 21, 1934  3 Sheets—Sheet 2
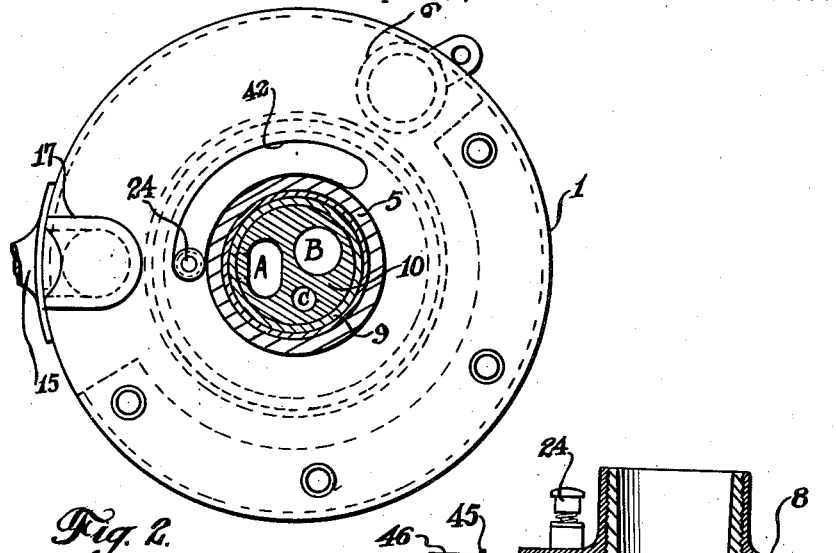
E. Getaz
INVENTOR
By: Glascock Downing Seebold
Attys.

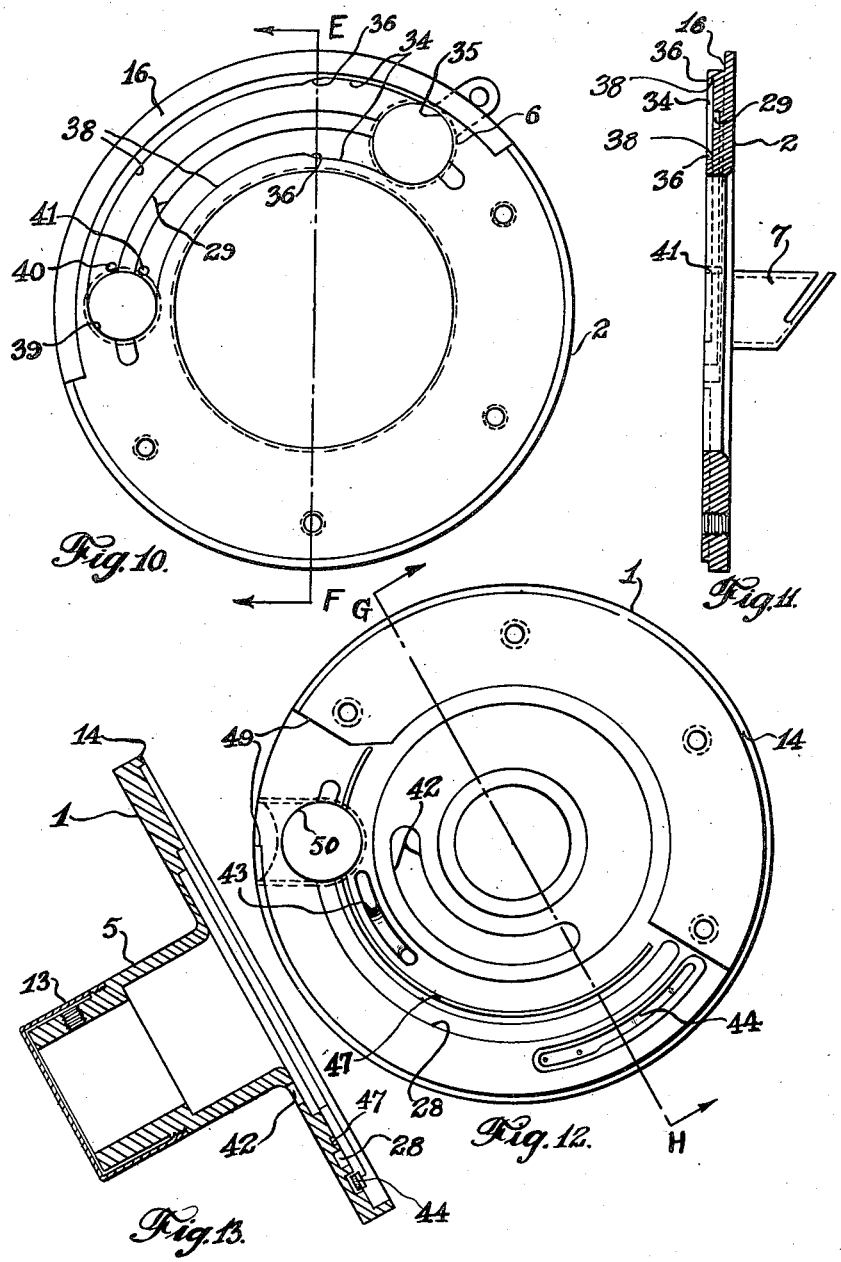

Patented Aug. 4, 1936

2,049,836

UNITED STATES PATENT OFFICE 2,049,836

COIN OPERATED LIQUID MEASURING AND DISPENSING DEVICE

Emile Getaz, Durban, Natal, Union of South Africa

Application September 21, 1934, Serial No. 744,984
In Great Britain September 27, 1933

3 Claims. (Cl. 194—97)

This invention relates to improvements in coin-operated liquid measuring and dispensing devices, and contemplates certain additional features relating to the device covered by my earlier United States Patent numbered 1,942,330.

It has since been found in practice that when the device, covered by the above patent, was used for measuring thick liquids such as certain oils, the existing arrangements for eliminating air locks were insufficient. One of the improvements contemplated relates to additional means for overcoming this disadvantage. Certain further improvements relate to additional features in connection with the coin-operated mechanism, and aim particularly at making the device proof against fraudulent use.

According to one feature of the present invention, the external groove in the plug member, referred to in my earlier patent 1,942,330 is replaced by a vertical duct or passage passing through the body of the plug and communicating with the inside of the measuring vessel by way of a port in the sleeve member. A second vent pipe is adapted to be screwed into the upper end of this duct, while its open end projects into the liquid container. A vent hole is provided on the side of the plug member outside and above the measuring vessel communicating with this vertical passage and providing direct communication between it and the atmosphere.

A further feature resides in the provision of a finger controlled air release valve for the purpose of clearing liquid from the lower ends of the air passages. The above improvements are particularly necessary where the measuring device is of a portable nature and is connected by a flexible hose to an elevated supply container. In this use of the invention, the two vent pipes will require to be of a flexible nature and will preferably be flexible tubes lying inside the hose and terminating inside and adjacent the top of the liquid supply container. An elongated spout may be provided enabling the liquid to be run directly from the measuring vessel into a constricted aperture.

A further feature consists in the provision of additional stop means for the purpose of frustrating attempts to use the machine fraudulently. This additional stop means consists of a shallow recess or depression in the lower plate member adjacent the mouth of the coin box. The depth of the recess is slightly greater than the thickness of the coin for which the machine is designed, and it is very slightly wider and longer than the diameter of the coin. When a coin is passed along towards the coin box by the forked handle member, the coin drops into this recess and a downwardly directed projection on the forked extremities of said member, co-operating with the edge of the recess, prevents rearward movement of the handle until the coin has been allowed to fall into the coin box.

Further features to prevent fraudulent use of the machine, consist in providing the top plate with a short downwardly projecting flange, shrouding the arcuate slot, and secondly providing a protection shroud on the top side of the triangular projection of the integrally formed sleeve flange, with a corresponding arcuate groove in the top plate to allow for free rotational movement of said sleeve. The handle adapted to operate this improved machine, will require to be altered in shape by the provision of a groove on its upper side to provide a clearance for the short downwardly depending flange on the top plate.

A further feature resides in the provision of steady pins projecting from the bottom plate at a point adjacent the coin slot and on the coin box side of it, for the purpose of keeping an inserted coin in a flat or horizontal position and so prevent its jamming the mechanism.

A further feature to prevent the possibility of a coin jamming, should the operator forget to bring the handle back to the filling position before inserting the next coin, is the provision of a second part circular notch cut out of the edge of the intergal flange of the rotatable sleeve, in such a position that when the handle is brought back to the filling position, the wrongly inserted coin is pushed through the slit adjacent the coin slot and is ejected. A further improvement according to the present invention, consists in the provision of an aperture directly beneath the coin slot of such a size that coins of a smaller diameter than that required to operate the machine will fall through said aperture and be recoverable by the operator.

To enable the device to be more clearly understood and carried into practice, reference will now be made to the accompanying sheets of drawings, in which like references refer to like parts throughout all views.

In the drawings, Figure 1 is a sectional elevation showing the complete apparatus.

Figure 2 is a part sectional plan taken on line AB in Fig. 1.

Figure 3 is a plan view of the flanged sleeve member with dotted outline showing relative position of operating handle.

Figure 4 is a sectional elevation taken on line CD in Fig. 3.

Figure 5 is a sectional plan taken on line AB in Fig. 1 but showing the top plate boss, sleeve, and plug member only, in a position where the filling aperture is open and to a large scale.

Figure 6 is a sectional plan taken on line JK in Figure 1 showing the relative position of the sleeve and plug member when the discharge aperture is open to the spout.

Figure 7 is an end elevation of the operating handle.

Figure 8 is a part sectional view showing the shape of the forked portion of the handle.

Figure 9 is a plan view of the complete handle.

Figure 10 is a plan view of the bottom plate.

Figure 11 is a sectional elevation taken on line EF in Fig. 10.

Figure 12 is an under plan view of the top plate.

Figure 13 is a sectional side elevation taken on line GH in Fig. 12.

Referring to the drawings, reference 1 denotes the top plate having an integrally formed boss 5. A bottom plate of ring shape is secured to the top plate 1 by means of counter-sunk screws 4. Attached to this bottom plate 2, is the coin box 6 and the coin reject slot 7.

Rotatably clamped between these two plates, is the flange 8 immovably secured to the sleeve 9. The sleeve 9 is rotatable on a tapered and ported plug member 10, adapted to be secured to the container or supply pipe by means of the coupling nut 11. The top plate 1 is securely attached to the plug member 10 by means of grub screws 12, which are hidden from view by the screwed on sheet metal cover 13. The top plate 1 is provided with a downwardly projecting flange 14 which engages with a corresponding annular recess formed in the bottom plate member 2.

An operating handle 15 is slidable in an arcuate slot formed between the top plate 1 and the bottom plate 2, and is shaped to engage slidably with the flange 14 on the top plate 1 while an arcuate recess in the bottom plate 2 forms a bearing for the lower portion of the handle, which recess is clearly shown at 16 in Figure 10.

The coin slot 17 is formed in the top plate 1, and the coin forms the connection between the inner portion of the handle 15 and the flange 8 of the sleeve 9, as shown in dotted outline in Figure 3.

The measuring vessel comprising preferably a glass cylinder 18 is clamped between the flange 8 and a washer 19 which forms the bottom of the chamber. The washer 19 is held in place by means of the clamping nut 20. Suitable packing rings 21 are inserted between the clamping nut 20 and the washer 19 so as to make a liquid tight joint. The plug member 10 is secured in place by means of lock nuts 22, which bear against the lower end of the sleeve 9. A spout 23 is adapted to be screwed on to the lower end of the sleeve 9 and projects over the lower open end of the plug member 10. The said spout may be of the shape illustrated, or it may be bell-mouthed, or alternatively it may be screwed for the attachment of an extension pipe or hose.

Attached to, and passing through the flange 8, is a finger controlled air release valve 24, which remains normally in the closed position due to spring pressure and which, when operated, allows escape of air from the top of the measuring chamber to atmosphere by way of the apertures 25.

The plug member 10 is provided at its upper end with three vertical passages or ducts A, B and C. Duct A is the delivery passage which connects with the supply container at its top end, and has communication with the measuring chamber 18 by means of a filling port G in the sleeve member 9. Liquid from the measuring vessel 18 is discharged by way of the discharge aperture H in the sleeve member 9, coinciding with a corresponding port towards the lower end of the plug 10 which communicates with the discharge passage 26. The position of the sleeve 9 in relation to the plug 10 will of course control the filling and discharging operations.

The duct B is for the purpose of allowing air from the measuring chamber 18 to pass into the supply container during the filling operation. When therefore the sleeve 9 is in such a position as to uncover the filling port R in the plug 10, the lower end of the duct B will be in communication with a port F in the sleeve member 9, thereby allowing entrapped air to escape to the top of the supply container above the level of the liquid, to which point the duct B must be connected by a suitable pipe or tube. Additional air lock eliminating means are provided by the duct C, which is likewise connected to the upper end of the supply container by means of a pipe or tube, while its lower end is adapted to be placed in communication with the port J in the sleeve 9 during the discharge of liquid from the measuring chamber. In addition, the duct C is connected directly to atmosphere by means of a communicating aperture 27, which is positioned above the boss 5 of the plate 1, and clearly shown in Fig. 1.

Referring to Figures 10 to 13 inclusive, it will be noted that both the top plate 1 and the bottom plate 2, are provided with arcuate grooves 28 and 29 respectively, in which the projections or lugs 30 and 31 on the inner forked ends of the handle 15, are adapted to slide, when the two plates are bolted together by means of the securing screws 4. As stated in my earlier patent numbered 1,942,330 the coin, on being inserted in the coin slot 17, falls into the part circular opening 32 in the inner end of the handle 15, and thereby forms the connection between the handle and a notch 33, cut out of the periphery of the flange 8. The handle may then be moved in a direction towards the coin box 6, and the coin falls through the aperture 35 in the plate 2 directly above it, when the handle 15 may be returned to its starting position beneath the coin slot. To prevent the handle with the coin being returned to the coin slot, before the coin has been deposited in the coin box 6, a shallow recess 34 is provided in the bottom plate 2 adjacent the coin box aperture 35. The depth of the recess 34 is slightly greater than the thickness of the correct denomination of coin, and its width is slightly greater than the diameter of the required coin. When therefore the handle 15 reaches a position above the said recess 34, the coin falls into it and forms a positive locking means, preventing the return of the handle before the coin has been deposited in the coin box 6. This action is accounted for by the fact that the arcuate groove 29 is slightly deeper than the recess 34, as clearly shown in Figure 11, and passes through the centre of it. When therefore the coin drops into the recess 34, it forms a positive locking piece between a downwardly directed projection on the bottom of the forked extremity 30, and the shoulders 36 of the recess 34.

Extending from the recess 34 towards the coin slot 17, is an arcuate recess 38 which is slightly narrower than the correct denomination of coin for which the machine is designed. If therefore a coin smaller than the correct diameter, is inserted in the coin slot, it passes along the arcuate recess 38 and is deposited in the coin box without operating the sleeve 9. In a modification, an aperture 39 is provided in the bottom plate 2 directly above a coin reject slot 7. The size of this aperture will be slightly smaller than the correct coin for operating the machine. In this case, the wrongly inserted coin will not be passed to the coin box, but, falling through the aperture 39, will be passed back to the operator by way of the reject slot 7. To prevent a badly worn coin of the correct denomination jamming against the edge of the aperture 39, two steady pins 40 and 41 are situated adjacent its edge as clearly shown in Figure 10. The tops of the steady pins 40 and 41, are arranged to be on a level with the face of the bottom plate 2, as indicated in Fig. 11. It will therefore be understood that the correct diameter of coin for operating the machine bridges the recess 38 until it reaches the wider recess 34 into which it drops, and is thereafter pushed along by the projection on the forked extremity 31 of the handle 15 until it drops through the aperture 35, communicating with the coin box 6.

To permit the required partial rotation of the sleeve 9 about the plug member 10, the top plate 1 is provided with an arcuate clearance slot 42 through which the air release valve 24 projects.

Located in arcuate grooves in the top plate 1, are the stop pawl 43 and the coin ejecting spring 44. Both these parts operate in a similar manner to the corresponding parts in my older machine covered by Patent No. 1,942,330 and no further description is necessary in this specification.

As a means to prevent fraudulent use of the machine by the insertion of thin strips of metal so as to make the stop pawl 43 inoperative, a protection shroud 45 is provided on the top side of the triangular projection 46 of the integral flange 8, which shroud is slidable in a corresponding arcuate groove 47 in the top plate 1 as clearly shown in Figures 12 and 13.

A further improvement consists in the provision of an additional part circular notch 48, cut out of the periphery of the integral flange 8. This provision is necessary to prevent the possibility of a coin jamming should the operator omit to bring the operating handle back to the filling position before inserting the next coin. In the improved machine even if he does this, the coin is carried round by the notch 48 until it is ejected through the slit 49 to be recovered by the operator for re-insertion.

To enable the working of the device to be more clearly understood, a description will now be given of its actual operation. With the operating handle 15 in the position shown in Fig. 1, that is, directly in line with the coin slot 17, the part circular opening 32 in the inner end of the handle is directly beneath the coin slot opening 50, while the port G in the sleeve 9, will be directly opposite the filling port R in the plug 10, so that free communication is established from the supply container through the filling duct A into measuring chamber 18. In this position the discharge port D in the plug member 10, will be closed by the sleeve 9 and the liquid will remain in the measuring vessel 18. When a coin of the correct denomination is inserted in the coin slot 17, it falls into the part circular opening 32 of the handle 15, and establishes connection between it and a notch 33 cut out of the periphery of the integral flange 8, which position is clearly illustrated in Fig. 3. If now the handle 15 is rotated in a clockwise direction with respect to Fig. 3, the integral flange 8, together with the sleeve 9, will be rotated and the coins will be caused to slide along the bottom plate 2 until it reaches the recess 34 into which it drops. In this position of the handle 15, the port H will be just commencing to overlap the port D in the plug member 10, thus allowing the contents of the measuring chamber 18 to commence discharging by way of the discharge duct 26. On further movement of the handle 15 towards the coin box 6, the discharge port D in the plug member 10 and the port H in the sleeve member 9, coincide completely and the whole of the contents are allowed to discharge from the measuring vessel 18. At this point the handle 15 will be directly in line with the coin box 6, and the ejection spring 44 will cause the coin to be ejected into the coin box 6 through the aperture 35 in the bottom plate 2. It will be noted that the discharge port D does not commence to open until the coin has fallen into the recess 34, thus preventing the return of the handle 15 towards the starting position. If this provision were not made, it might be possible to obtain more than one measure of liquid by the insertion of a single coin and the manipulation of the handle 15 so as to allow discharge of the contents of the measuring vessel 18 without allowing the coin to fall into the coin box 6, or into the recess 34.

During the filling operation, that is, when port G in the sleeve 9 coincides with filling port R in the plug 10, the port J in the sleeve 9 coincides with a port S in the plug member communicating with the air duct B. This provision allows the air in the measuring chamber 18 to be displaced by the entering liquid, upwards into the top portion of the supply container, and thereby eliminates air locks. To enable this to be understood, reference is made to Figures 5 and 6. Figure 5 shows to an enlarged scale the position of the sleeve 9 with respect to the plug 10 during the filling operation, while Figure 6 shows the relative positions during the discharge of a liquid from the measuring chamber 18. It will be noted that during the discharge of liquid, the air port J in the sleeve 9, communicates with port T communicating with the air duct C, which of course is in communication with the atmosphere by way of the aperture 27, positioned above the end of the boss 5 of the plate 1. By this provision, air is allowed to enter the measuring vessel 18 freely while liquid is being discharged therefrom, and thereby facilitates rapid emptying. When the device is used for thick liquids such as heavy oils, it will be necessary to operate the air release valvet 24 momentarily so as to free the end of the air ducts, which owing to the viscosity of the heavier oils, are apt to become clogged to a certain extent.

What I claim is:—

1. Coin operated means for a liquid measuring and dispensing device, having a ported plug member and a top and a bottom plate having an arcuate slit therebetween, rigidly connected to said member and a flanged ported sleeve surrounding said ported plug member, said flange being supported between said top and bottom plates so as to be capable of rotation to a limited extent and having an arcuate circumferential notch in the perimeter thereof, a handle extending through said arcuate slit having a forked end with projections on the extremities of each fork the projection on the leading fork being longer than the projection on the other fork, the space between said forks registering with the circumferential notch when in normal position, said bottom plate having an arcuate slot in which said projections are guided and said bottom plate having a coin box aperture therein and a shallow arcuate recess of a depth slightly greater than the thickness of the correct denomination of coin for operating the machine, adjacent the coin box aperture, whereby the coin on dropping into said shallow recess forms a positive locking piece between the adjacent downwardly directed projection on the leading fork of said handle and the end of the recess to prevent return of the coin and handle to the starting position before the handle has been moved sufficiently far to permit the said coin to be deposited in the coin box.

2. A coin-operated liquid measuring and dispensing device as claimed in claim 1, wherein the ported sleeve flange has a triangular extension, a second circumferential part circular notch in the periphery of said ported sleeve flange at a point remote from said triangular extension, and acts to eject coins of less diameter than a coin of the correct denomination through the slit between the top and bottom plates.

3. The device as claimed in claim 1, wherein said ported sleeve flange has a triangular extension, a protection shroud provided on the upper side of said extension and overlapping the slit between the top and bottom plates, and the top plate is provided with an arcuate groove in which said protection shroud is slidable thereby preventing the insertion of a metal strip between the top plate and the flange on the ported member.

EMILE GETAZ.